United States Patent [19]
Hickox et al.

[11] Patent Number: 5,612,842
[45] Date of Patent: Mar. 18, 1997

[54] LANDING ZONE INERTIAL LATCH

[75] Inventors: Thomas A. Hickox, Scotts Valley; Lawrence W. Gollbach, Felton, both of Calif.

[73] Assignee: Seagate Technology, Inc., Scotts Valley, Calif.

[21] Appl. No.: 456,045

[22] Filed: May 31, 1995

Related U.S. Application Data

[62] Division of Ser. No. 182,246, Jan. 13, 1994, abandoned.

[51] Int. Cl.$^6$ .................................. G11B 5/54; G11B 21/22
[52] U.S. Cl. .......................................................... 360/105
[58] Field of Search .................................... 360/105, 106, 360/104

[56] References Cited

U.S. PATENT DOCUMENTS

| | | | |
|---|---|---|---|
| 4,716,480 | 12/1987 | Wiens et al. | 360/105 |
| 5,189,576 | 2/1993 | Morehouse et al. | 360/105 |
| 5,262,912 | 11/1993 | Hudson et al. | 360/105 |
| 5,296,986 | 3/1994 | Morehouse et al. | 360/105 |
| 5,305,169 | 4/1994 | Anderson et al. | 360/105 |
| 5,363,261 | 11/1994 | Eckberg et al. | 360/105 |
| 5,369,538 | 11/1994 | Moe et al. | 360/105 |
| 5,404,257 | 4/1995 | Alt | 360/105 |
| 5,414,577 | 5/1995 | Arin et al. | 360/105 |

*Primary Examiner*—Stuart S. Levy
*Assistant Examiner*—William R. Korzuch
*Attorney, Agent, or Firm*—Flehr, Hohbach, Test, Albritton & Herbert

[57] ABSTRACT

A landing zone inertial latch which prevents the rotation of an actuator arm of a disc drive following a shock and has a latch mechanism whose axis is perpendicular to the central axis of the actuator arm. The latch mechanism is self-energizing so that the latch remains out of the way during normal operation of the inertial latch, but then is energized by the shock to prevent the actuator arm and, in particular, the transducer from leaving the landing zone during a shock. The landing zone inertial latch is small and compact since the inertia of the latch is not required to hold the actuator arm. A landing zone inertial latch is also provided which can prevent rotation of the actuator arm in either direction.

5 Claims, 3 Drawing Sheets

LANDING ZONE INERTIAL LATCH

This is a division of application Ser. No. 08/182,246, filed Jan. 13, 1994, now abandoned.

BACKGROUND OF THE INVENTION

In a fixed disc hard disc drive which are common to personal computers, the disc drive actuator and recording heads must be prevented from sudden movements when the disc drive is powered down in order to prevent damage to the disc recording media. This is a particular problem in drives using a voice coil motor; when the disc drive is powered down, there is no force which will prevent the recording heads from moving out of a landing zone and into areas of the recording media where data is stored and hitting the disc surface causing data loss. This is especially true with notebook and portable computers which are frequently moved and jostled.

Initially, the disc drive actuator arm was held in place by a physical lock which prevented movement. The problem with a physical lock is that it can fail in the locked position and prevent any further use of the disc drive until repaired. Also, a physical lock requires its own power source which increases power demand within the disc drive and increases the heat generated by the disc drive. These physical locks were often used for 3.5" disc drives since the drives were very large and could house a large power supply easily.

However, with the introduction of notebook and portable computers, hard disc drives needed to be much smaller, lighter and consume less power. The extra power required by a physical lock could no longer be tolerated and the excess heat generated by a larger power supply could not be adequately dissipated. In addition, since the newer hard disc drives are designed to be lightweight, the addition weight for the power supply needed for a physical lock can not be tolerated. Also, the extra space required by the larger power supply and the physical lock is not desirable.

After physical locks, ramp latches were introduced which did not require an independent power supply and were smaller in size. These ramp latches, however, required a ramp onto which the actuator arm was locked and required a physical lock to lock the actuator arm onto the ramp. Thus, if the physical lock failed, the disc drive would be inoperative until repaired.

After ramp latches, inertial latches were introduced which used the inertia of the latch to offset the inertia of the actuator arm and stop the movement of the actuator arm. These prior art inertial latches, however, were large since the lock itself held the actuator arm steady. In addition, the prior inertial latches were large since the inertia of the latch itself had to be large enough to balance and counteract the huge inertia of a large heavy actuator arm assembly.

SUMMARY OF THE INVENTION

Thus, it is an object of the present invention to provide a landing zone inertial latch mechanism for a hard disc drive which can prevent actuator arm movement in both rotary directions.

It is another object of the present invention to provide a landing zone inertial latch which is light-weight, but can stop an actuator arm under any rotary shocks.

It is another object of the present invention to provide a landing zone inertia latch which is small and compact so that it may be located at numerous places within the disc drive housing.

It is another object of the present invention to provide a landing zone inertial latch which latches onto the actuator arm so that the inertial mass of the landing zone inertial latch can be minimal such that the landing zone inertial latch is small and compact.

These and other objects of the present invention are provided by a landing zone inertial latch which latches onto the actuator arm so that the inertia of the latch may be less than the inertial of the actuator arm such that the landing zone inertial latch is small and compact. In addition, the landing zone inertial latch is self-energizing and is kept in a storage position during normal operation of the disc drive. Finally the landing zone inertial latch may be perpendicular to the axis of rotation of the actuator arm and can move to prevent actuator arm motion in response to any shock.

BRIEF DESCRIPTION OF THE DRAWINGS

Additional objects and features of the present invention will be more readily apparent from the following detailed description and the appended claims when taken in conjunction with the drawings, in which:

DETAILED DESCRIPTION OF THE PREFERRED EMBODIMENTS OF THE INVENTION

Figure 1:
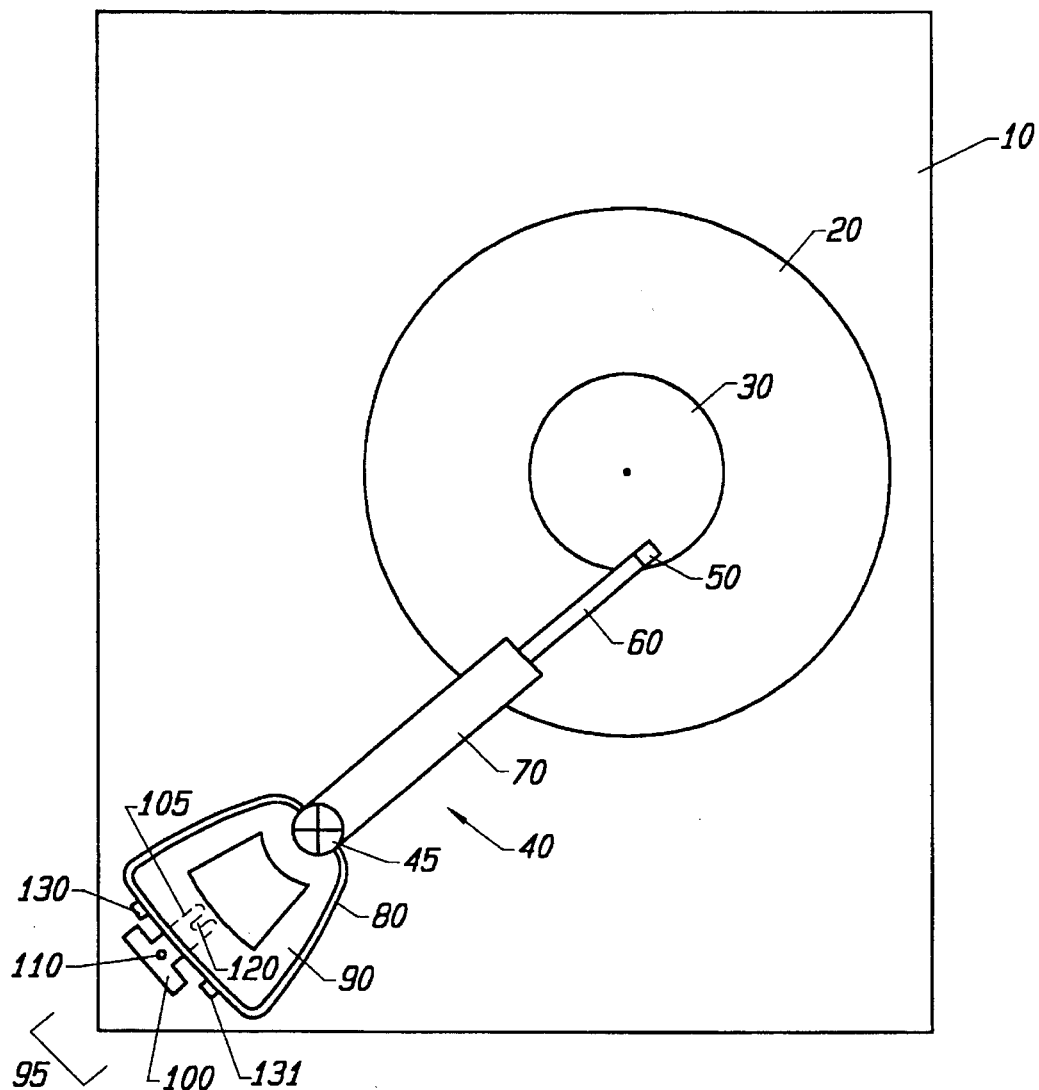
FIG. 1 is a schematic view of a typical actuator assembly which has a first embodiment of the landing zone inertial latch of the present invention attached to it.
Figure 2:
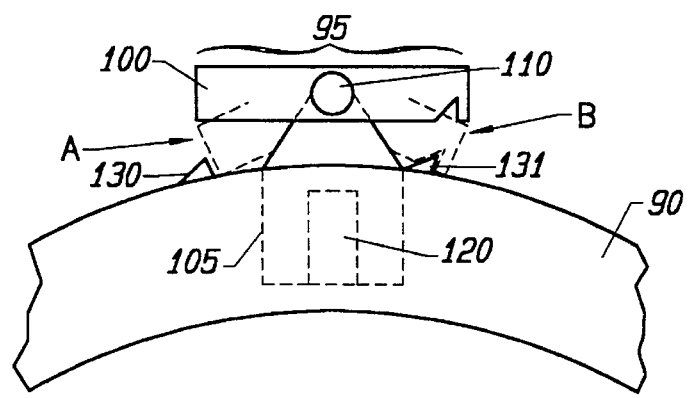
FIG. 2 is an exploded top view of the landing zone inertial latch shown in FIG. 1.

A first embodiment of the present invention will now be provided with reference to FIGS. 1 and 2. First, FIG. 1 shows a typical hard disc drive with the claimed landing zone inertial latch installed. The housing 10 of the disc drive is sealed which keeps contaminants, such as dust, away from delicate components of the hard disc drive. If a contaminant, such as a particle of dust enters the housing and lands on the disc drive magnetic media, the hard disc drive may crash. Thus, all of the components of a typical hard disc drive are contained within the sealed housing 10. A magnetic recording medium 20 is shown. The recording medium 20 has concentric tracks of magnetic particles which are used to store data. In order to access all of the tracks of the recording media 20, a disc drive spindle motor is attached to the center of the recording medium and causes the recording medium 20 to spin at a certain angular velocity. The spindle motor, which is located underneath the recording medium 20, is not shown for clarity. The recording medium 20 also has a landing zone 30 where no data tracks are located and the powered down recording heads can sit without damaging the recording medium.

To record data to the recording medium and read data from the recording medium 20, an actuator arm assembly 40 is used. The various components of the actuator arm assembly operate to move a transducer 50 (recording head) across the tracks of the recording medium 20 and to read and/or to write data from/to the recording medium 20. More specifically, the actuator arm assembly 40 includes an actuator arm 70, a flexure 60 and a slider with a recording head 50. The recording heads 50 are the element of the actuator arm assembly 40 which actually read and write data to and from the recording medium in a convention manner. The recording heads 50 fly above the recording media 20 on a cushion of air which is generated by the rotation of the recording media. The cushion of air is less than one micrometer thick. The flexure 60, which is attached to the recording head 50 biases the recording head 50 down towards the recording media 20. The actuator arm 70, which is attached to the flexure 60, connects the flexure and the recording head 50 to a voice coil motor which rotates the actuator arm assembly 40 about a pivot point 45 in response to electrical signals from the drive controller. The voice coil motor operates in a convention manner and will not be further described. When the disc drive is powered up, the voice coil motor will hold the actuator arm assembly steady at a defined, targeted position by a magnetic force generated by the voice coil magnets. However, when the disc drive is powered down, the voice coil motor does not generate a magnetic force and does not prevent the actuator arm from moving.

The part of the voice coil motor attached to the actuator arm assembly 40 is typically a voice coil 90. The voice coil motor also has voice coil motor magnets which are attached to the housing of the disc drive and are located directly above and below the voice coil 90 and are not shown for clarity reasons. There is also a voice coil overmold 80 which protects the voice coil 90 from damage. The voice coil magnets and the voice coil 90 together make up the voice coil motor which rotates the actuator arm assembly 40 using magnetic forces. The location of the coil and magnets could also be reversed i.e., the magnet carried on the arm, without changing the usefulness of this invention.

One embodiment of the landing zone inertial latch mechanism 95 of the present invention will now be described with reference to FIG. 1 which shows a typical hard disc drive actuator with an embodiment of the present invention and FIG. 2 which is an exploded top view of an embodiment of the present invention. The landing zone inertial latch 95 operates to keep the recording heads 50 of the actuator arm assembly within the landing zone 30 while the disc drive is powered down in order to prevent data loss. While the disc drive is powered up, the actuator arm and the recording heads are restrained by the force of the voice coil motor.

The landing zone inertial latch 95 prevents unrestrained movement of the recording heads and prevents recording media damage following a shock. For example, the landing zone inertial latch will prevent the coil overmold 90 and the entire actuator assembly from rotating by latching onto a pair of protrusions 130, 131 on the overmold 90. When the actuator assembly attempts to rotate clockwise, the actuator assembly will be prevented from moving because protrusion 131 will hit the landing zone inertial latch 95. On the other hand, if the actuator assembly rotates in a counter clockwise direction, the protrusion 130 is latched onto by the landing zone inertial latch and prevented from moving. Thus, this embodiment of the present invention prevents the actuator arm assembly and the recording heads from moving in either rotary direction.

The landing zone inertial latch 95 includes a U-shaped piece of non-magnetic material 100 which latches onto a pair of protrusions 130, 131 on the overmold 90 and prevent rotation of the actuator assembly as described above. This piece of non-magnetic material 100 is connected through a non-magnetic pivot pin 110 to a non-magnetic elongated portion 105 which is located beneath the voice coil overmold 90 and the voice coil 80. The non-magnetic pieces may also be brass. The elongated portion 105 has a magnetic insert 120 which is located inside of the elongated portion. The magnetic insert 120 is the only piece of the landing zone inertial latch which is magnetizable. The magnetic insert 120 is located beneath the voice coil 80 as well. The magnetic insert 120 operates to keep the landing zone inertial latch 95 in a storage position during normal operation of the disc drive by being attracted to the voice coil magnet's magnetic flux and causing the landing zone inertial latch to be automatically aligned to the voice coil magnets which holds the landing zone inertial latch in a storage position. The magnetic flux of the voice coil magnets acts as a bias force thereby making it unnecessary to have a physical bias spring within the system. Thus, this embodiment of the present invention is self-energizing and does not require any power source.

Now, a detailed description of the operation of the embodiment of landing zone inertial latch will be described. When a shock causes the actuator assembly and overmold to move in a clockwise direction, several events occur. First, the elongated portion 105 of the landing zone inertial latch 95 overcomes the bias force induced by the magnetic flux of the voice coil magnet in the magnetic insert 120 and rotates in a counterclockwise direction about pivot pin 110. This counterclockwise rotation of the elongated portion 105 causes the left side the latch piece 100 to move down towards the overmold 90 and position A. Then, as the actuator assembly and the overmold 90 rotate clockwise in response to the shock, the protrusion 130 of the overmold 90 is latched by the left side of the latch piece and the entire actuator assembly is prevented from moving further and the recording heads are prevented from moving outside of the landing zone 30. When the shock and rotation has subsided, the landing zone inertial latch 95 will return to its inoperative storage position until another shock occurs.

If a shock causes the actuator assembly to begin to rotate in a counterclockwise fashion, then the elongated portion 105 will overcome the bias force of the voice coil magnet and rotate in clockwise fashion about pivot point 110. This clockwise rotation of the elongated portion 105 will cause the right side of the latch piece 110 to move down towards the overmold 90 toward position B. Thus, the right side of the latch piece 100 will catch the protrusion 131 and the prevent the actuator assembly from moving any farther which in turn prevents the recording head 50 from moving outside the landing zone 30 and causing data loss. This embodiment provides a number of advantages: rotation in both directions is controlled; arm rotation during torsional shock is prevented; arm rotation in the event of direct or lateral shock is controlled; regardless of whether the coil end or head end is heavy; the latch piece automatically aligns to the VCM magnet; and there is no need to include a physical spring in the system, as the VCM magnet leakage provides the force to resolve alignment.

Figure 3:
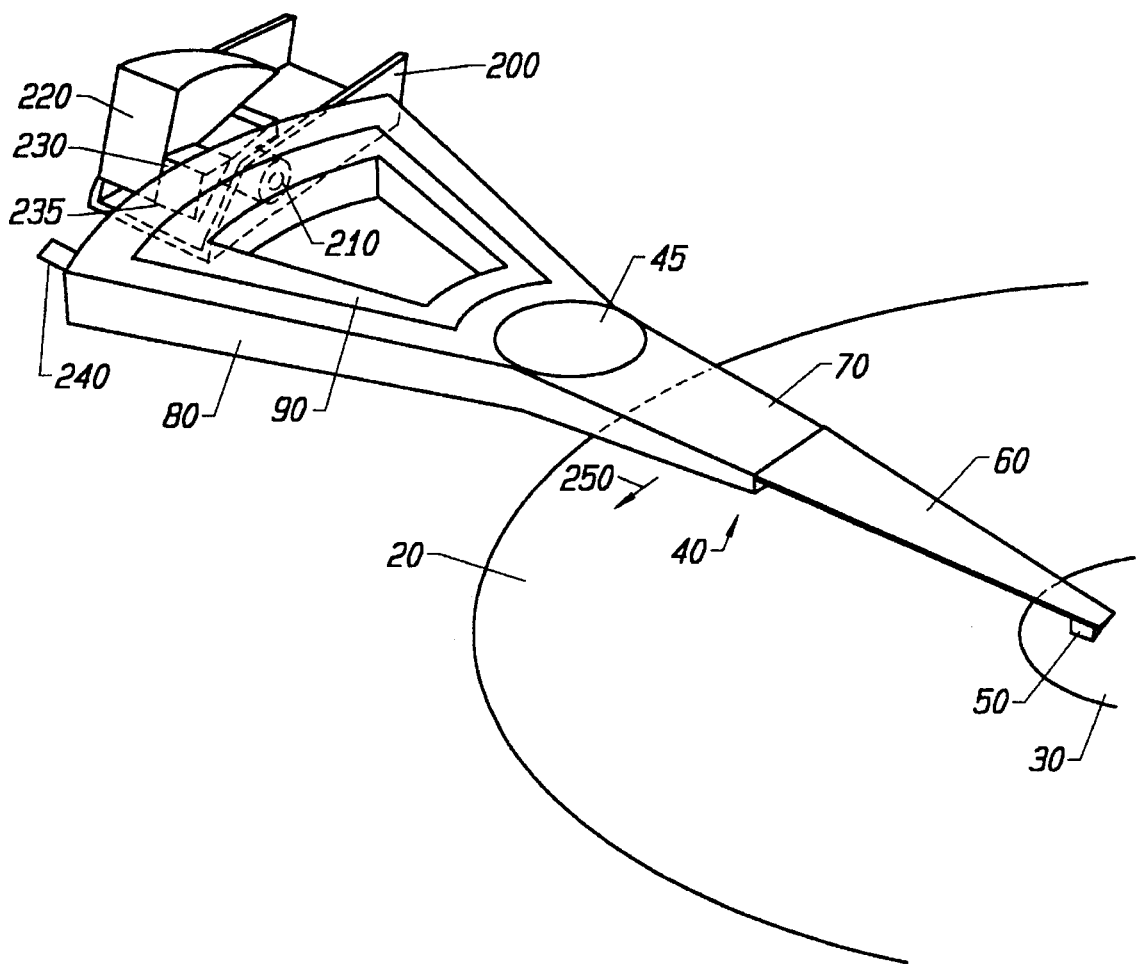
FIG. 3 is a three dimensional top view of a second embodiment of the landing zone inertial latch of the present invention.
Figure 4:
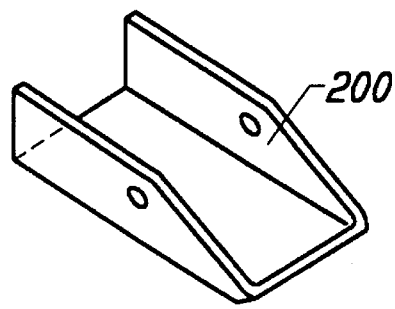
FIG. 4 is a perspective view of the U-shaped holder of the second embodiment of the present invention.
Figure 5:
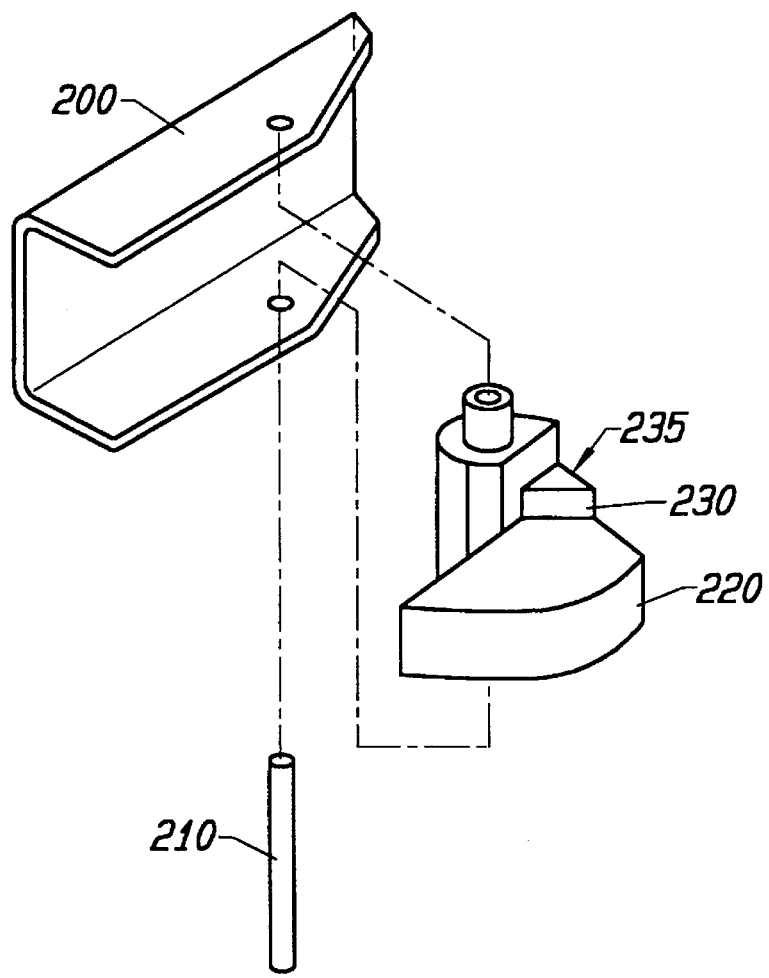
FIG. 5 is an exploded schematic view showing how the parts of the second embodiment of the present invention are connected together.

A second embodiment of the landing zone inertial latch of the present invention will now be described with reference to FIGS. 3, 4 and 5. FIG. 3 shows a three dimensional top view of a second embodiment of the present invention which is also a landing zone inertial latch. This embodiment also operates to keep the recording heads within the landing zone during a shock to the powered down disc drive. FIG. 3 shows the recording medium 20 which has a landing zone 30. There is no data located within the landing zone 30 so that the recording head 50 can sit on the recording media within the landing zone 30 without destroying any data. The structure of the actuator arm assembly is the same as the previous embodiment and will not be described here again.

As in the previous embodiment, the voice coil 90 has an overmold 80 which protects the coils 90 from any damage. The overmold 80 also has a latch pin 240 which is fixedly attached to the overmold 80. The operation of the latch pin 240 will be described below in connection with the discussion of the operation of this embodiment of the landing zone inertial latch.

The landing zone inertial latch has a U-shaped support piece 200 which holds the rest of the components of the landing zone inertial latch. The support piece 200 is attached to the housing 10. A more detailed view of the U-shaped support piece is shown in FIG. 4. The support piece 200 is located below the voice coils 90 and overmold 80. The support piece 200 has two holes drilled in opposite sides of the piece. A pin 210 fits through these holes and .secures an inertial mass 220 to the support piece 200 and allows the inertial mass 220 to rotate with respect to the support piece. The inertial mass 220 includes an impact member 230 having an impact surface 235; the impact member 230 is fixedly attached to the inertial mass 220. A more detailed view of the physical interconnections between the various components of the second embodiment of the landing zone inertial latch is shown in FIG. 5. As shown in FIG. 3, the major axis of the actuator arm assembly 40 and the axis of rotation of the landing zone inertial latch are at right angles to each other. This perpendicular orientation allows the landing zone inertial latch to occupy little space. Also the perpendicular orientation allows the inertial mass 220 to be much smaller since the inertial mass is only be utilized to move the latch pin into position.

While the disc drive is not being subjected to a shock, the inertial mass 220 is biased by a bias spring (not shown but located on the axis of the pin 210) into a storage position so that the inertial latch will not affect normal operation of the actuator arm assembly.

When a shock occurs, an unlatched powered down recording head 50 is prone to move outside of the landing zone and destroy data. For example, the actuator arm assembly may rotate in a direction as shown by arrow 250. To prevent this unwanted movement, the shock which causes the actuator arm to rotate in a direction shown by arrow 250 also causes the inertial mass 220 to overcome the bias force of the spring and rotate clockwise. This clockwise rotation of the inertial mass 220 causes the impact surface 235 to rotate upwards and stop in the path of the latch pin 240 which is fixedly attached to the overmold. The impact surface 235 will stop the movement of the latch pin 240 which in turn stops the movement of the actuator arm 40. Thus, the recording heads 50 of the actuator assembly 40 are prevented from moving outside of the landing zone 30. It should be noted that the landing zone inertial latch is self-energizing and will remain closed for the duration of the shock due to the force which the latch pin 240 is exerting upon the impact surface 235.

Once the shock has passed, the biasing force of the spring will return the landing zone inertial latch to its storage position out of the way of the actuator arm assembly. In particular, the impact surface 235 will rotate downwards with the inertial mass 220 and into a storage position out of the path of the latch pin 240. Then, when another shock occurs, the landing zone inertial latch will rotate again to stop unwanted movement. Since the present invention does not require any power source and the inertial mass 220 is small, the inertial latch can re-energize itself repeatedly without much lag time.

It should be noted that the inertial mass of the landing zone inertial latch is much smaller than the inertial mass of a typical inertial latch. This smaller inertial mass allows the present landing zone inertial latch to be smaller, compact and have a faster reaction time. The inertial mass is smaller for several reasons. First, the inertial mass of the landing zone inertial latch causes the rotation of the landing zone inertial latch and does not have to be large enough to counteract the huge inertial of the actuator arm assembly. Second, the landing zone inertial latch uses the force between the latch pin and the impact surface to hold the latch closed during a shock and does not have to be able to hold the actuator arm using its own inertia.

If a shock occurs which causes the recording heads 50 and actuator arm assembly 40 to move in the opposite direction, towards the center of the landing zone, the actuator arm assembly will be stopped by a crash stop and does not require that the inertial latch stop the arm. Thus, this embodiment of the present invention only prevents rotation of the recording heads away from the landing zone. However, due to the perpendicular orientation of the actuator arm and the landing zone inertial latch, this embodiment of the landing zone inertial latch is small and compact and can be placed at many locations within the disc drive housing.

While the claimed invention has been described with reference to a few specific embodiments, the description is illustrative of the invention and is not to be construed as limiting the invention. Various modifications may occur to those skilled in the art without departing from the true spirit and scope of the invention as defined by the appended claims.

I claim:

1. A disc drive system comprising:

a housing;

a motor fixed within said housing;

a fixed disc rotatably coupled to said motor which records data and has a landing zone where no data is located;

an actuator arm assembly further comprising voice coil magnets supported from said housing;

an actuator arm with a voice coil magnetically attracted to said voice coil magnets such that said voice coil magnets move said actuator arm in response to electrical signals, said voice coil being molded onto said actuator arm by an overmold;

a flexure rigidly fixed to said actuator arm;

a transducer fixed to an end of said flexure opposite an end connected to said actuator arm;

a landing zone inertial latch means for preventing said transducer from leaving the landing zone of said fixed disc when either a clockwise or counterclockwise external shock is applied to said housing, comprising:

a pair of protrusions held in place by said overmold;

and an elongated latch element of non-magnetic material supported for rotation about a pivot pin located immediately behind said voice coil and of sufficient length to be rotated into contact with one of said protrusions when rotating clockwise or counterclockwise;

said protrusions being spaced on said voice coil overmold so that one of said protrusions cooperates with said latch element when either a clockwise or counterclockwise shock causes motion of said actuator arm; said landing zone inertial latch means further comprises: a mass which is located beneath said voice coil of said actuator arm and has a means for maintaining said inertial latch means in a storage position during normal operation of said actuator arm assembly; said elongated latch element is connected to said mass for rotating after a shock has occurred and for latching with one of said protrusions of said actuator arm and preventing said transducer from leaving said landing zone; and wherein said landing zone inertial latch means is automatically aligned with said voice coil magnets by magnetic leakage flux which attracts a magnetic insert supported in said mass.

2. The disc drive of claim 1 wherein said magnetic insert of said mass is steel.

3. The disc drive of claim 1 wherein said mass is a non-magnetic material.

4. The disc drive of claim 1 wherein said mass is made of brass.

5. The disc drive of claim 1 wherein said means for maintaining said inertial latch means cooperates with said voice coil magnets to maintain said actuator arm in a non-operating position in the absence of shock.

* * * * *